US007944500B2

(12) United States Patent
Nihei et al.

(10) Patent No.: US 7,944,500 B2
(45) Date of Patent: *May 17, 2011

(54) IMAGE PROCESSING SYSTEM, IMAGE CAPTURING APPARATUS, AND SYSTEM AND METHOD FOR DETECTING BACKLIGHT STATUS

(75) Inventors: Kaname Nihei, Saitama (JP); Kazuhiko Takemura, Saitama (JP); Masahiko Sugimoto, Saitama (JP); Koichi Sakamoto, Saitama (JP); Hiroshi Fukuda, Saitama (JP); Atsuhiko Ishihara, Saitama (JP)

(73) Assignee: Fujifilm Corporation, Tokyo (JP)

( * ) Notice: Subject to any disclaimer, the term of this patent is extended or adjusted under 35 U.S.C. 154(b) by 980 days.

This patent is subject to a terminal disclaimer.

(21) Appl. No.: 11/774,949

(22) Filed: Jul. 9, 2007

(65) Prior Publication Data

US 2008/0012956 A1 Jan. 17, 2008

Related U.S. Application Data

(63) Continuation of application No. 10/329,335, filed on Dec. 27, 2002, now Pat. No. 7,304,682.

(30) Foreign Application Priority Data

Jan. 7, 2002 (JP) .................................. 2002-954

(51) Int. Cl.
*H04N 5/235* (2006.01)
*H04N 5/222* (2006.01)
*H04N 5/228* (2006.01)
*H04N 5/262* (2006.01)

(52) U.S. Cl. .................. 348/362; 348/370; 348/222.1; 348/239

(58) Field of Classification Search .......... 348/362–366, 348/370–371, 222.1, 239
See application file for complete search history.

(56) References Cited

U.S. PATENT DOCUMENTS

| 5,966,175 | A  | * | 10/1999 | Inoue ........................... 348/363 |
| 6,204,881 | B1 | * | 3/2001  | Ikeda et al. ................... 348/362 |
| 6,480,226 | B1 |   | 11/2002 | Takahashi et al. |
| 6,690,424 | B1 |   | 2/2004  | Hanagata et al. |
| 6,879,345 | B2 | * | 4/2005  | Kawanishi ..................... 348/362 |
| 7,057,650 | B1 | * | 6/2006  | Sakamoto ..................... 348/239 |
| 2002/0008771 | A1 | * | 1/2002 | Uchino et al. ................. 348/364 |

FOREIGN PATENT DOCUMENTS

| JP | 2-062580 A | | 3/1990 |
| JP | 6-189186 A | | 7/1994 |
| JP | 2002-062580 | * | 2/2002 |

* cited by examiner

*Primary Examiner* — Nhan T Tran
(74) *Attorney, Agent, or Firm* — Sughrue Mion, PLLC (57) ABSTRACT

An image processing system for properly correcting brightness of a subject area and a background area of a captured image. The image processing system includes an image capturing apparatus, including: an image capturing instruction unit for generating a first instruction signal and a second instruction signal for instructing a capturing of the subject; and an image pick-up unit for capturing a first image of the subject in response to the first instruction signal, and a second image of the subject in response to the second instruction signal. The image processing system also includes an image processing apparatus, including: a backlight status detector for detecting backlight status based on the first image and the second image; and a correction unit for correcting the second image when the backlight status detector detects the backlight status.

4 Claims, 4 Drawing Sheets

IMAGE PROCESSING SYSTEM, IMAGE CAPTURING APPARATUS, AND SYSTEM AND METHOD FOR DETECTING BACKLIGHT STATUS

This is a continuation of application Ser. No. 10/329,335 filed Dec. 27, 2002 now U.S. Pat. No. 7,304,682. The entire disclosure of the prior application Ser. No. 10/329,335 is hereby incorporated by reference.

This patent application claims priority from a Japanese patent application No. 2002-000954 filed on Jan. 7 2002, the contents of which are incorporated herein by reference.

BACKGROUND OF THE INVENTION

1. Field of the Invention

The present invention relates to an image processing system, an image capturing apparatus, and a system and a method for detecting backlight status. More particularly, the present invention relates to an image processing system for correcting images captured against backlight.

2. Description of Related Art

In conventional film processing, exposure time in printing is determined based on an image exposed on the photographic film. For example, in exposure control using large-area transmittance density (LATD), the exposure time in printing is determined so that integrated value of three primary colors of printed image becomes gray. Moreover, based on characteristics such as maximum density of three primary colors on the image, the image is classified into several scene positions and the exposure time in printing using the LATD is corrected based on operational expressions prepared for each of the scene positions.

However, when an image is photographed against backlight for example, even if appropriate the exposure time in printing is determined for a subject of the image, there is a problem that the exposure time in printing for a background of the image becomes inappropriate. Therefore, when an image is photographed against backlight, it is difficult to properly adjust the exposure time in printing for both the subject area and the background area.

SUMMARY OF THE INVENTION

Therefore, it is an object of the present invention to provide an image processing system, an image capturing apparatus and a system and a method for detecting backlight status which can solve the foregoing problem. The above and other objects can be achieved by combinations described in the independent claims. The dependent claims define further advantageous and exemplary combinations of the present invention.

According to the first aspect of the present invention, there is provided an image processing system including an image capturing apparatus for capturing an image of a subject and an image processing apparatus for performing image processing on the image captured by the image capturing apparatus. The image capturing apparatus includes an image capturing instruction unit for generating a first instruction signal and a second instruction signal for instructing a capturing of the subject; and an image pick-up unit for capturing a first image of the subject in response to the first instruction signal, and a second image of the subject in response to the second instruction signal. The image processing apparatus includes a backlight status detector for detecting backlight status based on the first image and the second image; and a correction unit for correcting the second image when the backlight status detector detects the backlight status. It is preferable that the image capturing apparatus further includes a storing unit for associating the first image and the second image mutually, and storing the first image and the second image.

The image processing system may include the image capturing apparatus including an image capturing instruction unit for generating a first instruction signal and a second instruction signal for instructing a capturing of the subject; an image pick-up unit for capturing a first image of the subject in response to the first instruction signal, and a second image of the subject in response to the second instruction signal; and a backlight status detector for detecting backlight status based on the first image and the second image. The image processing system may also include the image processing apparatus including a correction unit for correcting the second image when the backlight status detector detects the backlight status. In this case, it is preferable that the image capturing apparatus further includes a storing unit for associating the second image and detecting result of the backlight status detected by the backlight status detector and storing the second image and the detecting result.

Further, it is preferable that the image capturing apparatus further includes an electric flash for flashing light in response to the second instruction signal. It is also preferable that the image capturing apparatus further includes a extracting unit for extracting a second subject area which is an area indicating the subject and a second background area which is an area indicating a background of the subject. Alternatively, the image processing apparatus may include the extracting unit.

It is preferable that the extracting unit further extracts a first subject area which is an area corresponding to the second subject area, and a first background area which is an area corresponding to the second background area from the first image, and when a brightness of the first subject area is lower than that of the first background area by a first predetermined value and the brightness of the second subject area is higher than that of the first subject area by a second predetermined value, the backlight status detector judges such the status as the backlight status. Further, it is preferable that the correction unit heightens the brightness of the second subject area when the backlight status detector detects the backlight status and the brightness of the second subject area is lower than a third predetermined value.

Further, the correction unit may correct brightness of the second subject area based on a first table which stores a correlation between brightness before the correction and brightness after the correction, and may correct brightness of the second background area based on a second table which stores a correlation between brightness before the correction and brightness after the correction, the second table being different from the first table. The correction unit may also lower brightness of the second subject area when the brightness of the second subject area is higher than a fourth predetermined value. The correction unit may also generate a composite image based on the second subject area and the first background area when the backlight status detector detects the backlight status.

According to the second aspect of the present invention, there is provided an image capturing apparatus for capturing an image of a subject. The image capturing apparatus includes an image capturing instruction unit for generating a first instruction signal and a second instruction signal for instructing a capturing of the subject; an image pick-up unit for capturing a first image of the subject in response to the first instruction signal, and a second image of the subject in response to the second instruction signal; and a backlight status detector for detecting backlight status based on the first image and the second image. It is preferable that the image capturing apparatus further includes a correction unit for correcting the second image when the backlight status detector detects the backlight status.

According to the third aspect of the present invention, there is provided a backlight status detecting system for detecting backlight status. The backlight status detecting system includes an image acquisition section for acquiring a first image, which includes a first subject area indicating a subject and a first background area indicating a background of the subject, and acquiring a second image, which is an image of the same scene as that of the first image with different lighting condition from that of the first image, and which includes a second subject area corresponding to the first subject area and a second background area corresponding to the first background area; and a backlight status judging section for judging a backlight status when a brightness of the first subject area is lower than that of the first background area by a first predetermined value, and a brightness of the second subject area is higher than that of the first subject area by a second predetermined value.

According to the fourth aspect of the present invention, there is provided a backlight status detecting method for detecting backlight status. The backlight status detecting method includes steps of acquiring a first image, which includes a first subject area indicating a subject and a first background area indicating a background of the subject; acquiring a second image, which is an image of the same scene as that of the first image with different lighting condition from that of the first image, and which includes a second subject area corresponding to the first subject area and a second background area corresponding to the first background area; and judging a backlight status when a brightness of the first subject area is lower than that of the first background area by a first predetermined value, and a brightness of the second subject area is higher than that of the first subject area by a second predetermined value.

The summary of the invention does not necessarily describe all necessary features of the present invention. The present invention may also be a sub-combination of the features described above.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
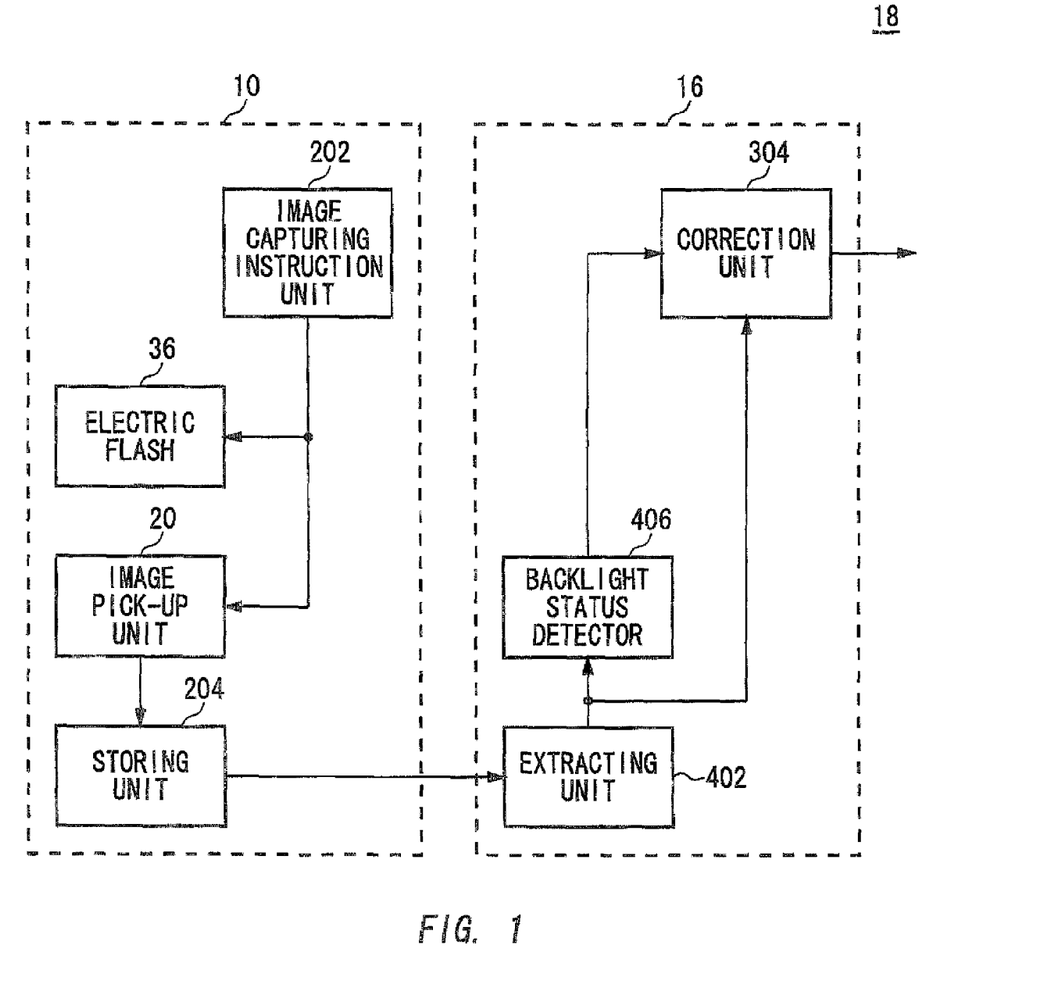
FIG. 1 is a block diagram showing a functional configuration of an image processing system according to an embodiment of the present invention.

FIG. 1 is a block diagram showing a functional configuration of an image processing system 18 according to an embodiment of the present invention. The image processing system 18 includes a digital camera 10 which is an example of an image capturing apparatus for capturing an image of a subject, and an image processing apparatus 16 for performing image processing on the image captured by the image capturing apparatus.

The digital camera 10 includes an image capturing instruction unit 202, an image pick-up unit 20, an electric flash 36, and a storing unit 204. The image capturing instruction unit 202 generates a first instruction signal and a second instruction signal for instructing a capturing of the subject. For example, the image capturing instruction unit 202 may generate the first instruction signal when a user depresses a release switch of the digital camera 10 halfway, and may generate the second instruction signal when the user depresses the release switch fully. The image capturing instruction unit 202 may generate the second instruction signal after elapse of a predetermined duration from the generation of the first instruction signal.

The image pick-up unit 20 captures a preliminary image, which is a first image of the subject, and a final image, which is a second image of the subject, in response to the first and second instruction signals respectively. In another embodiment, the image pick-up unit 20 may capture the final image in response to the first instruction signal, and may capture the preliminary image in response to the second instruction signal. It is preferable that the image pick-up unit 20 captures the final image based on the capturing conditions calculated by the digital camera 10 based on the preliminary image. For example, the digital camera 10 may set exposure automatically based on the preliminary image, and the image pick-up unit 20 may capture the final image based on the exposure set by the automatic exposure. The preliminary image is an image of the same scene as that of the final image with different lighting condition. Specifically, the electric flash 36 flashes light in response to the second instruction signal at the time of capturing of the final image. The storing unit 204 associates the preliminary image with the final image mutually and stores them.

The image processing apparatus 16 includes a extracting unit 402, a backlight status detector 406, and a correction unit 304. The extracting unit 402 extracts a final image subject area, which is an area of a subject on the final image, and a final image background area, which is an area of a background of the subject on the final image. In another embodiment, the digital camera 10 may include the extracting unit 402. The backlight status detector 406 detects a backlight status based on the preliminary image and the final image.

When a luminous source, such as sunlight or artificial lighting, illuminates the subject from behind toward the camera, the backlight status detector 406 may judge such the status as the backlight status. In the present embodiment, when the subject is darker than the background during an image capturing without the electric flash 36, the backlight status detector 406 judges such the status as a backlight status.

The correction unit 304 corrects the final image when the backlight status detector 406 detects the backlight status. For example, the final image corrected by the image processing apparatus 16 may be printed out or displayed on a display of a personal computer.

Functions of the extracting unit 402, the backlight status detector 406, and the correction unit 304 will be explained in further detail hereinafter. The extracting unit 402 extracts the final image subject area, which is an area of the subject on the final image, and the final image background area, which is an area of the background of the subject on the final image. For example, the extracting unit 402 may recognize a person located at a substantially center of the final image by image recognition, and may extract the area including the person as the final image subject area. The extracting unit 402 may extract an area where flash light of the electric flash 36 reaches as the final image subject area in the final image. In this case, the extracting unit 402 may judge the area where the flashlight reaches based on brightness of each pixel of the preliminary image, and brightness of each pixel of the final image. In this embodiment, the extracting unit 402 further extracts a preliminary image subject area, which is an area corresponding to the final image subject area, and a preliminary image background area, which is an area corresponding to the final image background area.

The backlight status detector 406 detects the backlight status based on the preliminary image and the final image. The backlight status detector 406 may detect the backlight status based on the brightness of all or some of the final image subject area, the final image background area, the preliminary image subject area and the preliminary image background area. For example, the backlight status detector 406 may regard an average of the brightness of pixels in each area as the brightness of each area. In the present embodiment, when the brightness of the preliminary image subject area is lower than that of the preliminary image background area, where the preliminary image is captured without the electric flash 36, and the flashlight of the electric flash 36 reaches the subject on the final image, the backlight status detector 406 judges such the status to be the backlight status. Furthermore, when the brightness of the preliminary image subject area is lower than that of the preliminary image background area by a first predetermined value, and the brightness of the final image subject area is higher than that of the preliminary image subject area by a second predetermined value, the backlight status detector 406 may judge such the status to be the backlight status.

The backlight status detector 406 may include a brightness comparison unit, an electric flash status judging unit, and a backlight status judging unit. The brightness comparison unit may compare the brightness of the preliminary image subject area and the brightness of the preliminary image background area. It is preferable that the brightness comparison unit detects the status where the brightness of the preliminary image subject area is lower than that of the preliminary image background area by the first predetermined value. The electric flash status judging unit may judge whether the flashlight of the electric flash 36 reaches the subject at the time of the final image capturing. When the brightness of the final image subject area is higher than that of the preliminary image subject area by the second predetermined value, the electric flash status judging unit may judge that the flashlight of the electric flash 36 reaches the subject. When the brightness comparison unit judges that the brightness of the preliminary image subject area is lower than that of the preliminary image background area by the first predetermined level, and when the electric flash status judging unit judges that the flashlight of the electric flash 36 reaches the subject, the backlight status judging unit may judge such the status as the backlight status.

The correction unit 304 corrects the brightness of the final image. In the present embodiment, the correction unit 304 corrects the brightness of the final image when the backlight status detector 406 detects the backlight status. The correction unit 304 may correct the brightness of the final image subject area and the brightness of the final image background area respectively. The correction unit 304 may correct the brightness of the final image based on the brightness of all or some of the final image subject area, the final image background area, the preliminary image subject area and the preliminary image background area. The correction unit 304 may include a brightness judging unit, a processing level calculating unit, and a processing unit. The brightness judging unit may judge the brightness of all or some of the final image subject area, the final image background area, the preliminary image subject area and the preliminary image background area. The processing level calculating unit may calculate the processing level of the correction based on the brightness. The processing unit may correct the final image by image processing based on the processing level.

In the present embodiment, the backlight status detector 406 detects the backlight status, and when the correction unit 304 judges that brightness of the final image subject area is lower than that of the final image background area, the correction unit 304 heightens the brightness of the final image subject area. For example, when the backlight status detector 406 detects the backlight status, and the brightness of the final image subject area is lower than a third predetermined value, the correction unit 304 may heighten the brightness of the final image subject area. Accordingly, even if sufficient brightness for the final image subject area is not obtainable by the flashlight of the electric flash 36 at the time of the final image capturing, the brightness of the final image subject area is corrected to appropriate brightness.

When the backlight status detector 406 detects the backlight status and the brightness of the final image subject area is higher than a fourth predetermined value, the correction unit 304 may lower the brightness of the final image subject area. Accordingly, even if the brightness of the final image subject area becomes superfluously high by the flashlight of the electric flash 36, for example, at the time of the final image capturing, the brightness of the final image subject area is corrected to appropriate brightness. Moreover, even if a color of a skin of a person existing in the final image subject area is washed out by the flashlight of the electric flash 36, for example, the color of the skin of the person is corrected appropriately. In another embodiment, when the backlight status detector 406 detects the backlight status and the brightness of the final image subject area is higher than the fourth predetermined value, the correction unit 304 may lower the brightness of the final image subject area and the final image background area.

The correction unit 304 may correct the brightness of the final image subject area based on a first table which stores a correlation between the brightness before and after the correction, and may correct the brightness of the final image background area based on a second table which stores a correlation between the brightness before and after the correction, the second table being different from the first table. The first and second tables may be look up tables (LUT) which indicate corrections of a gamma correction respectively, where the corrections of the first table and the second table are different from each other. The correction unit 304 may correct a plurality of areas based on a plurality of LUTs respectively, where the LUTs are different from each other.

According to the present embodiment, the brightness of the final image subject area and the brightness of the final image background area are corrected individually. Accordingly, even if the final image is captured in the backlight status, the brightness of the final image subject area and the brightness of the final image background area are corrected appropriately.

In another embodiment, when the backlight status detector 406 detects the backlight status, the correction unit 304 may correct the final image background area based on the preliminary image background area. When the backlight status detector 406 detects the backlight status, the correction unit 304 may generate a composite image based on the final image subject area and the preliminary image background area. The correction unit 304 may generate the composite image by superimposition of the final image subject area and the preliminary image background area. According to this example, even if the brightness of the final image background area is unsuitable due to the flashlight of the electric flash 36 at the time of the final image capturing, the composite image is obtainable with the brightness of the final image subject area and the brightness on an area corresponding to the final image background area being corrected appropriately.

Figure 2:
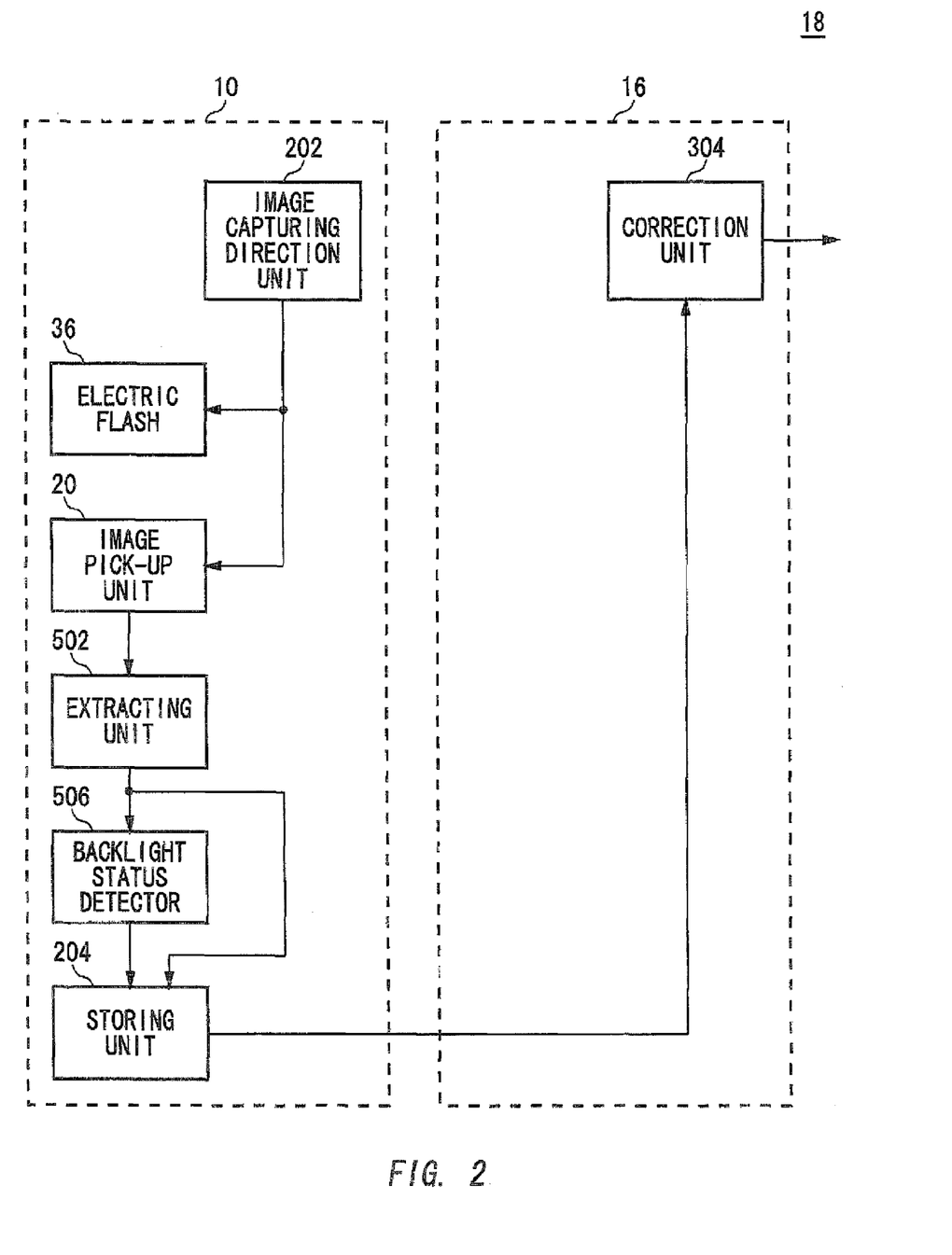
FIG. 2 is a block diagram showing a functional configuration of an image processing system according to another embodiment of the present invention.

In yet another embodiment, the digital camera 10 may include the image capturing instruction unit 202, the image pick-up unit 20 and an backlight status detector 506, and the image processing apparatus 16 may include the correction unit 304 as shown in FIG. 2. In this case, it is preferable that the digital camera 10 further includes the electric flash 36, an extracting unit 502, and the storing unit 204 which associates mutually the final image with detecting result of the backlight status detected by the backlight status detector 506 and stores them. The backlight status detector 506 and the extracting unit 502 have the same or similar function as/to that of the backlight status detector 406 and the extracting unit 402 respectively, explained in reference to FIG. 1. The storing unit 204 may further store the preliminary image in association with the final image. Also in this example, the brightness of the final image subject area and the final image background area are corrected appropriately.

In yet another embodiment, the digital camera 10 may include the image capturing instruction unit 202, the image pick-up unit 20, the backlight status detector 506 and a correction unit 504. The correction unit 504 has the same or similar function as/to that of the correction unit 304 explained in reference to FIG. 1.

Next, operation of the image processing system 18 in the present embodiment will be explained hereinafter. First, the image capturing instruction unit 202 generates the first instruction signal for instructing the capturing of the subject, and the image pick-up unit 20 captures the preliminary image in response to the first instruction signal. The image capturing instruction unit 202 may generate the first instruction signal based on instructions of a user. Next, the storing unit 204 stores the preliminary image. Next, the image capturing instruction unit 202 generates the second instruction signal for instructing the capturing of the subject, and the electric flash 36 flashes light. The image pick-up unit 20 captures the final image in response to the second instruction signal. Next, the storing unit 204 stores the final image.

Next, the extracting unit 402 extracts the final image subject area and the final image background area based on the preliminary image and the final image. At this time, the extracting unit 402 further extracts the preliminary image subject area and the preliminary image background area. Next, the backlight status detector 406 detects a backlight status based on all or some of the brightness of the final image subject area, the final image background area, the preliminary image subject area and the preliminary image background area. When the backlight status detector 406 detects the backlight status, the correction unit 304 corrects the final image.

Figure 3:
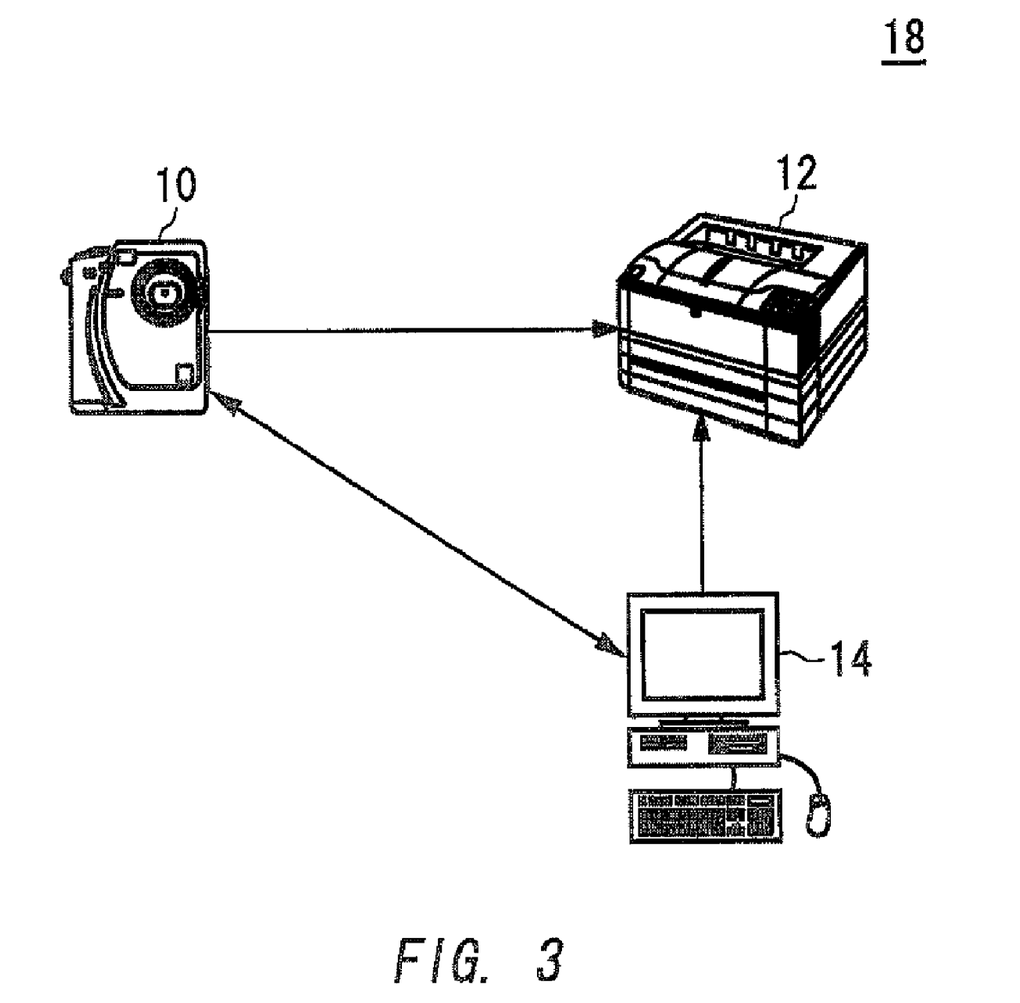
FIG. 3 is an example of the image processing system according to the embodiment of the present invention.

FIG. 3 is a schematic view illustrating the image processing system 18 according to the present embodiment. The image processing system 18 includes the digital camera 10, a printer 12, and a personal computer 14. The digital camera 10, the printer 12, and the personal computer 14 communicate with one another through a data transmission line. The data transmission line is, for example, a cable communication medium, such as IEEE1394 or USB, or a radio communication medium, such as IrDA, Bluetooth or wireless LAN. The data transmission line may be a network which includes a plurality of cable-communication media and radio-communication media, e.g., the Internet. A record medium, such as removable medium, may be used for delivery of the data among the digital camera 10, the printer 12, and the personal computer 14.

The digital camera 10 captures an image of a subject and transmits the captured image data to the printer 12 or the personal computer 14. In the present embodiment, the digital camera 10 transmits the preliminary image and the final image, which are the captured image data, to the printer 12 and the personal computer 14. The printer 12 or the personal computer 14 performs predetermined image processing on the received image data, and outputs the image data. In the present embodiment, the printer 12 or the personal computer 14 includes the backlight status detector 406 and the correction unit 304 explained in reference to FIG. 1. The printer 12 or the personal computer 14 outputs the final image corrected by the correction unit 304 when the backlight status detector 406 detects a backlight status. That is, the printer 12 prints out the corrected final image, and the personal computer 14 outputs the corrected final image on a display. The personal computer 14 transmits setting information to the digital camera 10 or the printer 12 to change the setting information of the digital camera 10 or the printer 12.

The digital camera 10 is an example of the image capturing apparatus, and the printer 12 and the personal computer 14 are examples of the image processing apparatus 16 explained in reference to FIG. 1. The image capturing apparatus may be a digital still camera which photographs a still image, and may be a digital camcorder which takes movies. The image processing apparatus may be a printer for a photo processing shop, which automatically adjusts the quality of the image captured by the digital camera, and prints the image out.

Figure 4:
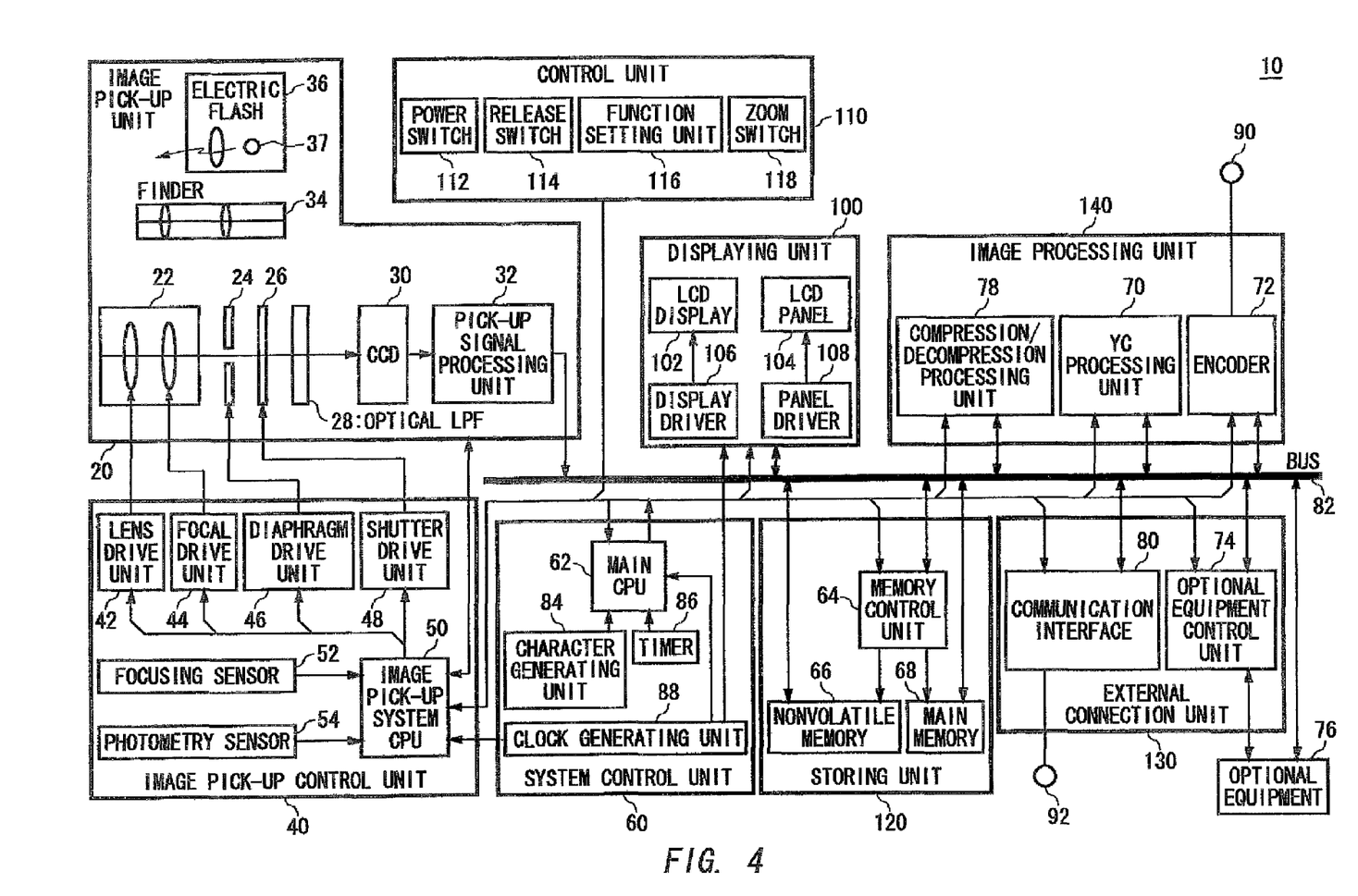
FIG. 4 is a block diagram showing an example of a detailed configuration of the digital camera according to the present embodiment.

FIG. 4 is a block diagram showing an example of a configuration of the digital camera 10 according to the present embodiment. The digital camera 10 includes the image pick-up unit 20, an image pick-up control unit 40, a system control unit 60, a displaying unit 100, a control unit 110, the storing unit 120, an external connection unit 130 and the image processing unit 140. The control unit 110 has the same or similar function as/to that of the image capturing instruction unit 202 explained in reference to FIG. 1. The image pick-up unit 20 has the same or similar function as/to that of the image pick-up unit 20 and the electric flash 36 explained in reference to FIG. 1.

The image pick-up unit 20 includes a taking-lens unit 22, a diaphragm 24, a shutter 26, optical LPF 28 (low pass filter), the CCD 30 (charge-coupled device), the pick-up signal processing unit 32, a finder 34, and the electric flash 36. The electric flash 36 has the same or similar function as/to that of the electric flash 36 explained in reference to FIG. 1.

The taking-lens unit 22 takes and processes a subject image. The taking-lens unit 22 includes a focal lens, a zoom lens, etc., and forms the image of the subject onto surface of the CCD 30. The diaphragm 24 limits the light which passes the taking-lens unit 22, and the optical LPF 28 passes light having longer wavelength component than a predetermined wavelength. Each of the photo detectors 300 included in the CCD 30 stores charge according to quantity of light of the formed subject image (the charge is referred to as "stored charge" hereinafter).

The shutter 26 is a mechanical shutter and controls whether to form the image of the light onto the CCD 30, the light passing the taking-lens unit 22. The digital camera 10 may include an electronic shutter function instead of the mechanical shutter 26. In order to realize the electronic shutter function, each of the photo detectors 300 of the CCD 30 has a shutter gate and a shutter drain. The stored charge is discharged to the shutter drain by turning on the shutter gate. Duration of storing the charge to each of the photo detectors 300, i.e., shutter speed, is controllable by controlling the shutter gate. In the CCD 30, the stored charge is read by a shift register by applying a readout gate pulse, and is read sequentially as a voltage signal by applying the register transfer pulse.

The pick-up signal processing unit 32 separates the voltage signal indicating the subject image outputted from the CCD 30, i.e., an analog signal, into R, G, and B components. The pick-up signal processing unit 32 adjusts white balance of the subject image by adjusting R, G, and B components. The pick-up signal processing unit 32 performs gamma correction of the subject image. The pick-up signal processing unit 32 converts the analog signal, which is separated into R, G, and B components, to a digital signal, and image data of the digital signal of the subject image (referred to as "digital image data" hereinafter), obtained by the A/D conversion, is outputted to the system control unit 60.

The finder 34 may have a displaying means and may display various information from below-mentioned main CPU 62, etc. The electric flash 36 includes a discharge tube 37, which discharges energy stored in a capacitor, and when the energy is supplied to the discharge tube 37, the electric flash 36 functions by the discharge tube 37 emitting light. In the present embodiment, the image pick-up unit 20 captures the preliminary image and the final image in response to the first and second instruction signals respectively, which are received from the control unit 110. The electric flash 36 flashes light in response to the second instruction signal.

The image pick-up control unit 40 includes a lens drive unit 42, a focal drive unit 44, a diaphragm drive unit 46, a shutter drive unit 48, an image pick-up system CPU 50 which controls the drive units above, a focusing sensor 52, and the photometry sensor 54. The lens drive unit 42, the focal drive unit 44, the diaphragm drive unit 46, and the shutter drive unit 48 include driving means, such as a stepping motor, and drive mechanical components in the image pick-up unit 20. According to depression of the release switch 114, the focusing sensor 52 measures distance to the subject, and the photometry sensor 54 measures brightness of the subject. The focusing sensor 52 and the photometry sensor 54 supply focusing data and photometry data to the image pick-up system CPU 50, where the focusing data means the data of the measured distance to the subject, and the photometry data means the data of the measured brightness of the subject.

The image pick-up system CPU 50 controls the lens drive unit 42 and the focal drive unit 44, and adjusts a zoom magnification and a focus of the taking-lens 22 based on photography information, such as a zoom magnification directed by a user. Alternatively, the image pick-up system CPU 50 may control the lens drive unit 42 and the focal drive unit 44, and may adjust a zoom magnification and a focus based on the focusing data received from the focusing sensor 52.

The image pick-up system CPU 50 determines stop and shutter speed based on the photometry data received from the photometry sensor 54. The diaphragm drive unit 46 and the shutter drive unit 48 control the aperture size of the diaphragm 24, and the opening and closing of the shutter 26 in accordance with the determined value.

The image pick-up system CPU 50 controls light emission of the electric flash 36 based on the photometry data received from the photometry sensor 54, and adjusts the aperture size of the diaphragm 26 simultaneously. When the user instructs to take an image, the CCD 30 starts to store the charge and outputs the stored charge to the pick-up signal processing unit 32 after the shutter time calculated from the photometry data is elapsed.

The system control unit 60 includes main CPU 62, a character generating unit 84, a timer 86, and a clock generating unit 88. The main CPU 62 controls whole parts of the digital camera 10, especially the system control unit 60. The main CPU 62 sends and receives required information to/from the image pick-up systems CPU 50 by serial communication or the like.

The clock generating unit 88 generates an internal clock of the main CPU 62, and supplies it to the main CPU 62. The clock generating unit 88 also generates internal clocks of the image pick-up system CPU 50 and the displaying unit 100. The clock generating unit 88 may supply the clocks having different frequencies to the main CPU 62, the image pick-up system CPU 50, and the displaying unit 100, respectively.

The character generating unit 84 generates text and graphic information, which is superimposed onto the captured image, such as date/time or a title of the image. A timer 86 has backing of battery etc., counts time always, and supplies time information, such as information about the captured date/time of the captured image, to the main CPU 62 based on the counted value. It is preferable that the power is supplied to the timer 86 from the battery so as to count time even when main power supply of the digital camera is switched off. It is also preferable that the character generating unit 84 and the timer 86 are annexed to the main CPU 62.

The storing unit 120 includes a memory control unit 64, nonvolatile memory 66, and main memory 68. The memory control unit 64 controls the nonvolatile memory 66 and the main memory 68. The nonvolatile memory 66 is composed of EEPROM (electrically erasable programmable read only memory) or flash memories etc., and stores it with data which is to be held even when the power supply of the digital camera 10 is switched off, such as setting information set by a user or a factory preset value. The nonvolatile memory 66 may store a boot program, a system program, etc. of the main CPU 62.

It is preferable that the main memory 68 is composed of memory which is relatively inexpensive and has large capacity, like DRAM. The main memory 68 has a function as frame memory to store the data outputted from the image pick-up unit 20, a function as system memory which loads various programs, and a function as a work area. The nonvolatile memory 66 and the main memory 68 communicate with each part inside/outside the system control unit 60 through a bus 82. The nonvolatile memory 66 may further store the digital image data.

The image processing unit 140 includes an YC processing unit 70, an encoder 72, and a compression/decompression processing unit 78. The external connection unit 130 includes an optional equipment control unit 74 and a communication interface 80.

The YC processing unit 70 performs YC conversion to the digital image data, and generates a luminance signal Y, a color difference signals B-Y and R-Y. The main memory 68 stores the luminance signal and the color difference signals based on control of the memory control unit 64.

The compression/decompression processing unit 78 reads the luminance signal and the color difference signals sequentially from the main memory 68, and compresses them. Then the optional equipment control unit 74 writes the compressed digital image data (referred to as "compressed data") in a memory card which is an example of the optional equipment 76. In the present embodiment, the memory card associates the preliminary image with the final image mutually and stores them. Moreover, the memory card, which is an example of the optional equipment 76 connecting with the external connection unit 130 has the same or similar function as/to that of the storing unit 204 explained in reference to FIG. 1.

The encoder 72 converts the luminance signal and the color difference signals into a video signal (such as NTSC or PAL signal), and outputs the video signal from a terminal 90. When generating the video signal from the compressed data recorded on the optional equipment 76, the compressed data is supplied to the compression/decompression processing unit 78 at first through the optional equipment control unit 74. Then, the data is decompressed in the compression/decompression processing unit 78 and the encoder 72 converts the decompressed data into the video signal.

The optional equipment control unit 74 performs generation, logical conversion, and/or voltage conversion of the signal that flows between the bus 82 and the optional equipment 76, in order to conform the signal to the specification of the optional equipment 76 and the bus 82. Other than the above-mentioned memory card, the digital camera 10 may support a standard PCMCIA I/O card, for example, as the optional equipment 76. In this case, the optional equipment control unit 74 may be composed of bus control LSI for PCMCIA standard or the like.

The communication interface 80 performs control such as protocol conversion to comply with the communication specification supported by the digital camera 10, e.g., USB, RS-232C, Ethernet, etc. The communication interface 80 may output the compressed data or the digital image data to external equipment or to a network through a terminal 92. The communication interface 80 includes a driver IC if necessary and communicates with external equipment through the terminal 92. The communication interface 80 may be adapted to communicate with the external equipment, such as a printer, a Karaoke machine or a video game machine, through an original standard interface.

The displaying unit 100 includes an LCD display 102, an LCD panel 104, a display driver 106, and a panel driver 108. The display driver 106 controls the LCD display 102. The panel driver 108 controls the LCD panel 104. The LCD display 102 is positioned on the back face of the camera, of which the size is about 2 inches for example, and displays an image currently captured, a playback image, zoom magnification of the captured or playback image, remaining battery charge, date/time, mode selection screen, a subject image, etc. The LCD panel 104 is a monochrome LCD, for example, is positioned on top face of the camera, and displays information, such as quality of the image (fine, normal, basic, etc.), flash mode (forced flash, suppressed flash, etc), number of available frames, number of pixels, and remaining battery charge.

The control unit 110 includes a power switch 112, the release switch 114, a function setting unit 116, and a zoom switch 118. The power switch 112 switches the digital camera 10 on and off based on instructions of a user. The release switch 114 can be depressed in two levels, i.e., halfway depression and full-depression. For example, when the release switch 114 is depressed halfway, the image pick-up control unit 40 performs automatic focusing and automatic exposure, and the image pick-up unit 20 captures a subject image by depressing the release switch 114 fully. The release switch 114 may have the same or similar function as/to that of the image capturing instruction unit 202 explained in reference to FIG. 1. The release switch 114 may generate the first instruction signal in response to the half-depression of the release switch 114, and may generate the second instruction signal in response to the full-depression of the release switch 114.

The function setting unit 116 is, for example, a rotatable mode dial or a 4-direction button and accepts settings such as "file format", "special effect", "print", "determine/save", "change display", etc. The zoom switch 118 accepts setting of zoom magnification of the subject image captured by the image pick-up unit 20.

The digital camera 10 having the above-mentioned structure operates in the following manner. First, the power switch 112 is depressed and power is supplied to each part of the digital camera 10. The main CPU 62 judges whether the digital camera 10 is in photography mode or in playback mode by reading status of the function setting unit 116.

When the digital camera 10 is in photography mode, the main CPU 62 supervises the depression status of the release switch 114. When the half-depression of the release switch 114 is detected, the image pick-up system CPU 50 acquires photometry data and focusing data from the photometry sensor 54 and the focusing sensor 52, respectively. The image pick-up control unit 40 adjusts focus and stop of the image pick-up unit 20, etc. based on the photometry data and the focusing data acquired by the image pick-up system CPU 50. After the adjustment, the LCD display 102 informs a user about the completion of the adjustment by displaying characters, such as "standby". In the present embodiment, when the half-depression of the release switch 114 is detected, the release switch 114 generates the first instruction signal, and the image pick-up unit 20 captures the preliminary image. The preliminary image is once stored in the main memory 68, then is processed in the YC processing unit 70 and the compression/decompression processing unit 78, and is recorded in an optional equipment 76 via the optional equipment control unit 74.

Then, the main CPU 62 supervises the depression status of the release switch 114. When the full-depression of the release switch 114 is detected, the shutter 26 is closed after a predetermined shutter time is elapsed and the stored charge of the CCD 30 is discharged to the pick-up signal processing unit 32. The digital image data, generated as a result of processing by the pick-up signal processing unit 32, is outputted to the bus 82. In the present embodiment, when the full-depression of the release switch 114 is detected, the release switch 114 generates the second instruction signal, and the image pick-up unit 20 captures the final image which is the digital image data. The digital image data is once stored in the main memory 68, then it is processed in the YC processing unit 70 and the compression/decompression processing unit 78, and is recorded in the optional equipment 76 via the optional equipment control unit 74. The captured image based on the recorded digital image data is displayed on the LCD display 102 for a while, so that a user can check the captured image. As described above, a sequence of the photographing operation is finished.

On the other hand, when the digital camera 10 is in playback mode, the main CPU 62 reads the captured image from the main memory 68, the nonvolatile memory 66, and/or the optional equipment 76, and displays the image on the LCD display 102 of the displaying unit 100.

In this state, when a user directs either "move forward" or "move backward" on the function setting unit 116, the main CPU 62 reads another captured image stored in the main memory 68, the nonvolatile memory 66, and/or the optional equipment 76, and displays the image on the LCD display 102 of the displaying unit 100.

As described above, according to the present invention, the brightness of the final image subject area and the final image background area can be corrected appropriately.

Although the present invention has been described by way of an exemplary embodiment, it should be understood that those skilled in the art might make many changes and substitutions without departing from the spirit and the scope of the present invention which is defined only by the appended claims.

What is claimed is:

1. A backlight status detecting system for detecting backlight status, comprising:
    an extracting unit extracts a first background area, which is an area corresponding to a second background area, from a first image,
    an image acquisition section for acquiring the first image, which includes a first subject area indicating a subject and the first background area indicating a background of the subject, and acquiring a second image, which is an image of the same scene as that of the first image with different lighting condition from that of the first image, and which includes a second subject area corresponding to the first subject area and the second background area corresponding to the first background area; and
    a backlight status judging section for judging a backlight status when a brightness of the first subject area is lower than that of the first background area by a first predetermined value, a brightness of the second subject area is higher than that of the first subject area by a second predetermined value,
    wherein the backlight status detecting system is included in an image processing apparatus.

2. A backlight status detecting method for detecting backlight status, comprising steps of:
    providing an image processing apparatus which includes a backlight detecting system performing:
    extracting a first background area, which is an area corresponding to a second background area, from a first image,
    acquiring the first image, which includes a first subject area indicating a subject and the first background area indicating a background of the subject;
    acquiring a second image, which is an image of the same scene as that of the first image with different lighting condition from the first image, and which includes a second subject area corresponding to the first subject area and the second background area corresponding to the first background area; and
    judging a backlight status when a brightness of the first subject area is lower than that of the first background area by a first predetermined value, a brightness of the second subject area is higher than that of the first subject area by a second predetermined value.

3. An image processing apparatus for performing image processing on the image captured by an image capturing apparatus, comprising:
    an extracting unit extracts a first background area, which is an area corresponding to a second background area, from a first image,
    an image acquisition section for acquiring the first image, which includes a first subject area indicating a subject and the first background area indicating a background of the subject, and acquiring a second image, which is an image of the same scene as that of the first image with different lighting condition from that of the first image, and which includes a second subject area corresponding to the first subject area and the second background area corresponding to the first background area; and
    a correction unit for correcting the second image when a backlight status detector detects the backlight status, said correction unit correcting brightness of the second subject area based on a first table which stores a correlation between brightness of a second brightness before the correction and brightness after the correction, and corrects brightness of the second background area based on a second table which stores a correlation between brightness before the correction and brightness after the correction, the second table being different from the first table.

4. An image processing apparatus for performing image processing on the image captured by an image capturing apparatus, comprising:
    a correction unit for correcting a second image without correcting a first image with different lighting condition from the second image when a backlight status detector detects the backlight status, said correction unit generating a composite image based on a second subject area which is included in the second image and a first background area which is included in the first image when said backlight status detector detects the backlight status,
    wherein the backlight status detector detects said backlight status when a brightness of a first subject area of the first image is lower than that of a first background area of the first mage by a first predetermined value, a brightness of a second subject area of the second image is higher than that of the first subject area of the first image by a second predetermined value.

* * * * *